United States Patent
Schell

[11] 3,841,370
[45] Oct. 15, 1974

[54] FEED ASSEMBLY

[76] Inventor: Friedrich Peter Schell, 4313 San Bernardino Ave., Las Vegas, Nev. 89102

[22] Filed: Dec. 11, 1972

[21] Appl. No.: 314,131

Related U.S. Application Data

[63] Continuation-in-part of Ser. No. 198,727, Nov. 15, 1971.

[52] U.S. Cl................ 144/144.5, 33/23 C, 83/413, 90/13.2, 144/145 R
[51] Int. Cl.............................................. B27c 5/06
[58] Field of Search........ 144/134 R, 134 A, 144 R, 144/144 A, 145 R, 145 A, 154, 137, 144.5; 83/410, 413, 565; 33/23 C; 90/13.1, 13.2; 214/1.3

[56] References Cited
UNITED STATES PATENTS

| | | | |
|---|---|---|---|
| 2,142,863 | 1/1939 | Whitney | 144/145 A |
| 2,426,487 | 8/1947 | Clausing | 144/145 A |
| 2,722,957 | 11/1955 | Marvesh | 144/134 A |
| 3,393,719 | 7/1968 | Rhodes et al. | 144/145 R |
| 3,442,309 | 5/1969 | Jentsch | 83/413 X |
| 3,473,580 | 10/1969 | Dunn et al. | 144/145 R X |
| 3,739,826 | 6/1973 | Schell | 83/413 X |

*Primary Examiner*—Andrew R. Juhasz
*Assistant Examiner*—W. D. Bray
*Attorney, Agent, or Firm*—Jerry R. Seiler

[57] ABSTRACT

An improved feeding and shaping assembly comprises an upper platform on a reciprocally driven support carriage with means providing pivotal and pendular or eccentric displacement of the upper platform relative to the support carriage, means for driving the support carriage, means for providing controlled linear guidance of the reciprocally driven support carriage and adjustable biasing means for urging the upper platform laterally with respect to the support carriage. In a preferred embodiment the pivotal displacement is provided by a plurality of pivot arms one end of each arm being attached to the upper platform and the opposite end to the support carriage.

38 Claims, 12 Drawing Figures

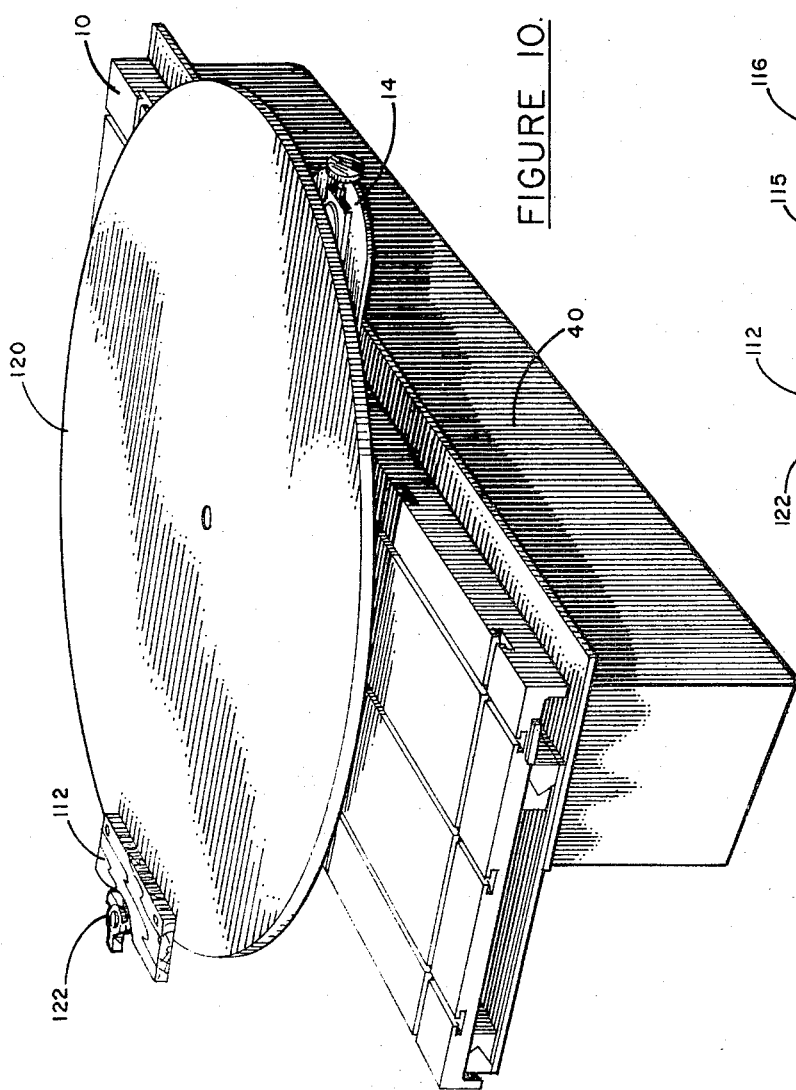
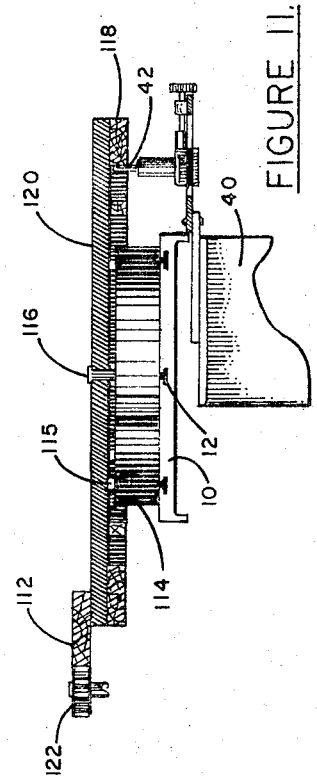

FEED ASSEMBLY

BACKGROUND OF THE INVENTION

This application is a continuation-in-part of my co-pending application Ser. No. 198,727, filed Nov. 15, 1971.

Although a number of devices have been used for shaping material workpieces, no independent feed systems have been proposed which may be used with any independent cutting or shaping tools and which incorporate entirely independent guidance and drive means. Accordingly, it is an object of the invention to provide a versatile apparatus incorporating unique guidance means whereby an almost limitless variety of shapes can be easily reproduced on material workpieces. It is a further object to provide an apparatus that can reproduce its own template from an original shaped article. It is another object to provide a material feeding assembly that directs a material workpiece to any existing and accessible cutting, shaping or working tools. Accordingly, the proposed device may be stationed adjacent or attached to a stationary and independent tool or a portable tool may be secured to the device for reproducing a material workpiece, limited only by the shape of a template design. These objects and the advantages offered by the invention will be understood from the following description.

SUMMARY OF THE INVENTION

The present invention is directed to a highly versatile feeding assembly for attaching material workpieces to be shaped or a working or shaping tool or both. The basic assembly comprises:

a. a reciprocally driven support carriage, b. an upper platform attached to the support carriage by a plurality of pivot arms, one end of each arm being pivotally attached to the upper platform and the opposite end pivotally attached to the support carriage, whereby the upper platform may be displaced laterally while remaining parallel to the longitudinal axis of the support carriage, c. means for driving the support carriage reciprocally along a linear guide track, and d. biasing means for urging the upper platform laterally with respect to the support carriage.

The assembly may also include a stationary or movable base member for supporting the platform, carriage and other assembly components. In addition, in a preferred embodiment, the top surface of the upper platform is provided with a series of channels or "T" slots for securing or attaching materials any one of a number of accessories or attachments to provide a variety of different feeding or shaping capabilities.

In the basic assembly shown, a template is secured to a stationary template support attached to the base member adjacent one side of the upper platform and a guide member for contacting the template is attached to the upper platform. A biasing member, such as a spring, attached to the support carriage and the upper platform, constantly urges the platform laterally with respect to the support carriage to an extent determined by the guide member acting against the stationary template. Alternatively, the template may be secured to the upper platform and urged against a stationary guide member. In either case the upper platform, while remaining parallel with the support carriage, is laterally displaced in varying distances determined by the shape of the template pattern acting against the guide member.

A material workpiece on which the template pattern is to be reproduced is secured to the upper platform adjacent the side opposite the guide member and template. A stationary cutting or shaping tool, located alongside the upper platform will act on the material workpiece as it passes, with its longitudinal motion imparted by the linearly driven support carriage and its lateral motion imparted by lateral displacement of the upper platform.

In another embodiment of the basic assembly, a cutting or shaping tool is secured to the upper platform adjacent a stationary material workpiece, while a template secured to the opposite side of the upper platform from the cutting tool, is urged against the guide member.

The above-described basic assembly is adaptable to receive a variety of accessories to yield apparatus for performing a number of different shaping operations. One accessory comprises a lathe-like apparatus secured to the upper platform and includes a pair of end supports, between which an elongated material workpiece is supported and turned, while a stationary standard or custom cutting or shaping tool acts on the workpiece. The workpiece is directed longitudinally along the tool by the linearly driven support carriage and a symmetrical pattern is formed on the turning workpiece by the tool in response to the lateral upper platform displacement as the guide member is urged against a template. By substituting different template designs, such an embodiment achieves an infinite variety of three dimensional shapes.

In still another accessory embodiment, an irregular three dimensional pattern may be copied on a material workpiece utilizing two end support pairs, attached to the upper platform, a template pattern supported between one of the end support pairs and a material workpiece between the other end support pair. The template and material workpiece are turned or rotated either in the same or opposite directions about their respective support axes by synchronized drive means while a stationary guide member maintains abuttment with the shaped template. The tool gradually shapes the material workpiece either in identical or mirror image form, as the upper platform travels with its linearly driven support carriage and is displaced laterally as the template is urged against the guide member.

In still another accessory embodiment, a rotatable table is secured to the upper platform on which table one or more material workpieces are attached as are one or more templates, preferably on the table side opposite the workpieces. The workpieces are shaped by a stationary cutting or shaping tool while a stationary guide member maintains abutment with the template or templates preferably opposite the table side from the tool. This embodiment includes drive means for rotating the table.

In yet another accessory embodiment, a pair of rotatable tables are attached to the upper platform while a synchronized drive means rotates the tables in either the same direction or oppositely. On one of the tables is placed a template while on the other a material workpiece is secured. A standard or custom stationary guide member follows the template edge as it is rotated. In operation of this embodiment, drive means for longitudinal linear motion of the support carriage is not activated. The biasing member continually urges the upper platform against the guide member which abuts the rotating template.

In another embodiment, a plurality of templates may be secured to an exchangeable template support drum attached along one side of the assembly so that the drum can be turned to expose different of the templates as desired. This embodiment is used effectively for any of the previously described embodiments where a stationary template is used adjacent one side of the upper platform.

BRIEF DESCRIPTION OF THE DRAWINGS

FIG. 10 is a perspective view illustrating a rotatable table attachment for shaping material workpieces;

FIG. 11 is an end sectional elevation of the rotatable table apparatus of FIG. 10.

DETAILED DESCRIPTION OF THE INVENTION

Figure 1:
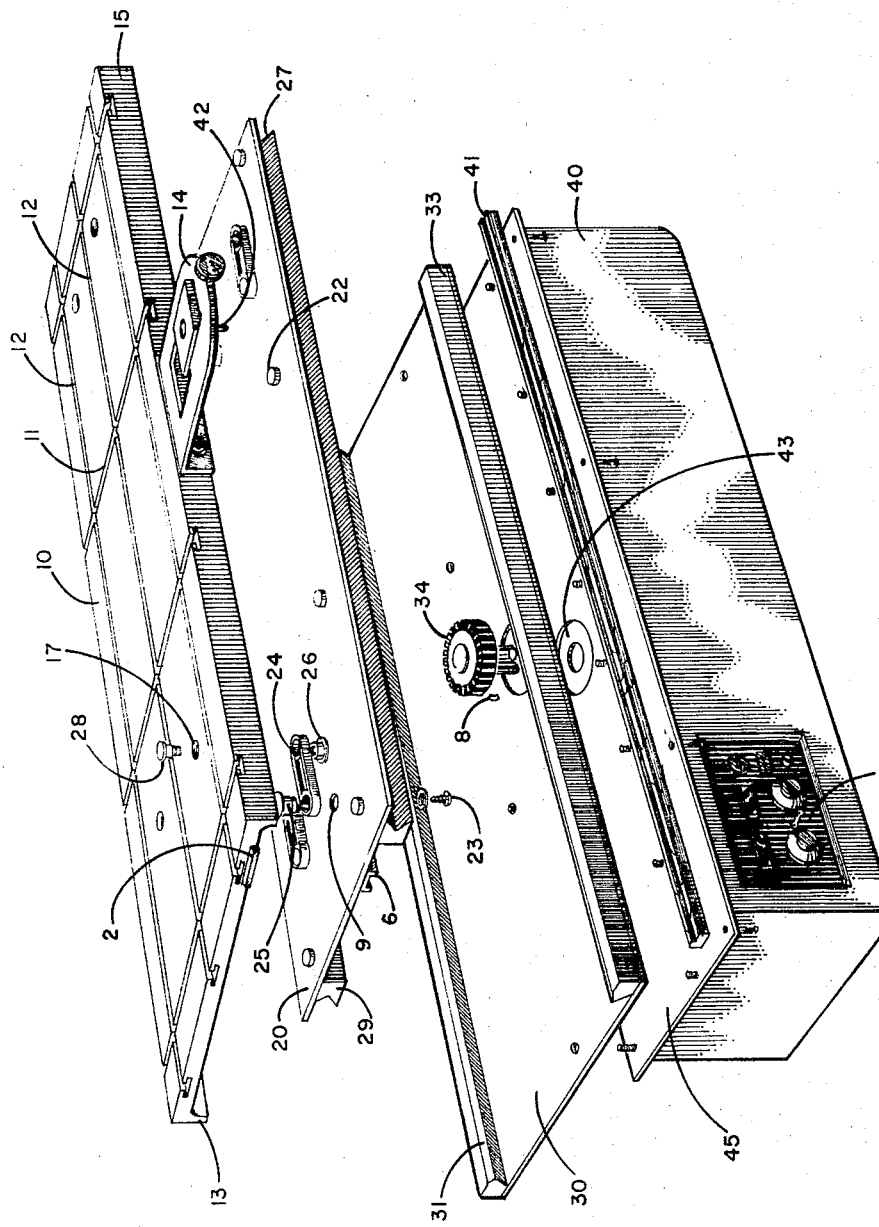
FIG. 1 is a view in perspective of the basic assembly of the invention showing components disassembled.

Referring now to FIG. 1, the basic feeding assembly of the invention is shown with various components separated to more clearly show their interconnection and operation. The assembly includes an upper platform 10 having a plurality of slots 11 and 12 extending along the exposed upper surface. It will be noted that the slots are the shape of an inverted "T" and extend from edge to edge. However, the shape of the slots is not critical so long as an accessory having a similarly shaped member can be secured to upper platform 10. Any number of transverse slots 11 and longitudinal slots 12 may be used and the number is not especially critical so long as they are located conveniently for securing an accessory as will be more fully explained hereinafter. Skirts 13 and 15 are shown extending downwardly along each side of the upper platform, which skirts are optional but are convenient for attaching or securing appendant members such as mount 14. The skirts may also function to limit the extent to which the upper platform can be moved laterally with respect to support carriage 20 over which the skirts hang.

Located beneath upper platform 10 is support carriage 20 connected to the upper platform by a plurality of pivot arms 24. These pivot arms provide for lateral movement of the upper platform while maintaining parallel orientation to the longitudinal axis of the driven support carriage. The specific number and position of pivot arms may be selected depending on stability requirements. The pivot arms are secured to the upper platform and support carriage by any suitable means which will allow lateral displacement of the upper platform relative to the support carriage. For this purpose, any desirable connections may be used including rivots, nuts and bolts, and the like, which connect one end of each pivot arm to the upper platform and the other end to the support carriage and about which connection the pivot arm is free to pivot or rotate. In the preferred embodiment shown, each end of a pivot arm 24 is provided with an opening into which a bearing and threaded stud or screw can extend. Pivot bearing 26 extends upwardly through the orifice in one end of pivot arm 24 and is secured to threaded stud 28 which projects downwardly through aperture 17 in upper platform 10. Similarly, threaded screw 23 projecting upwardly through aperture 9 in support carriage 20 threadedly engages bearing 25 which extends through the opposite end of pivot arm 24. Thus, both ends of the pivot arm are free to pivot or rotate on the respective bearings 25 and 26 and all other pivot arms are similarly attached. Accordingly, upper platform 10 may be moved laterally in an eccentric, pendular or arc-like horizontal displacement on the pivot arms while being maintained parallel relative to the longitudinal axis of the support carriage.

Figure 2:
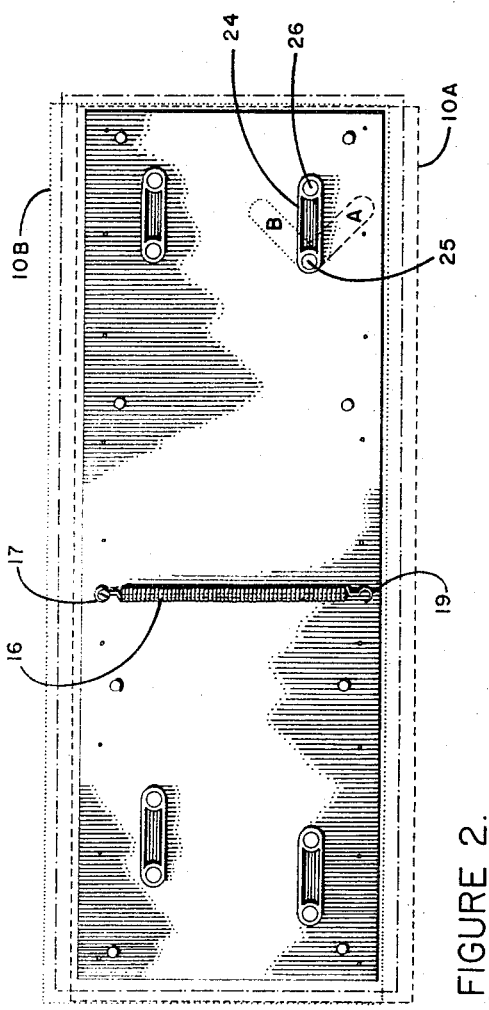
FIG. 2 is a top plan view of the support carriage and illustrating different upper platform lateral displacement positions in phantom.

The pivotal and eccentric, arc-like or pendular lateral displacement may be more readily understood by observing FIG. 2 illustrating the movement of upper platform 10 using four pivot arms. For example, observing pivot arm 24 phantom pivot arm positions A and B correspond to the lateral displacements 10A and 10B of the upper platform, respectively. It will be understood that the distance between the pivot points of each arm must be substantially identical.

Although parallel pivot arms as shown in FIG. 2 may be preferred, the use of discs as described in my copending parent application and incorporated herein by reference, or other members pivotally connected at each end may be used. However, in all cases one end of the pivoting member must be connected to the upper platform while the other end is pivotally connected to the support carriage in order to achieve the desired result.

Alternatively, the lateral displacement described in FIG. 2 may be achieved by incorporating a plurality of shafts, spindles or other pivots extending downwardly from the upper platform to which pivot arms are attached and their free ends directed along or in arc-shaped grooves or slots in the support carriage by corresponding arc-shaped projections from their free ends. Of course, the pivots could also extend upwardly from the support carriage and the free ends of the arms in this case would be directed by grooves in the upper platform. Friction reducing means including bearings and the like will also preferably be incorporated so that the movement of the arc-shaped projections within the slots will be precise. Such an embodiment, although not separately shown will be understood observing FIG. 2 wherein an arc-shaped groove or slot would lie along the path taken by bearing 26 at the end of pivot arm 24. A corresponding arc-shaped projection extending downwardly from the point of bearing 26 into the groove would direct the movement of the free end of arm 24. Thus, although a pivot arm would not be used as such, a pivot point of the arc would correspondingly lie at the center of bearing 24, assuming the distance between bearings 25 and 26 to be the same as the length of the pivot arm shown. Other equivalent means for attaining the pivotal and eccentric or pendular displacement of the upper platform may be evident to those skilled in the art and are considered to be within the purview of the invention.

Support for the upper platform on the support carriage is provided by intermediate support pads 22. The support pads preferably comprise material having a relatively low coefficient of friction, for example, Teflon or the like. Observing also FIG. 5, support pads 22 are shown which are secured to support carriage 20 and upon which the upper platform rests. Again, it will be appreciated that any number of such support pads may be used as desired so long as substantial load carrying capacity of the upper platform is achieved regardless of its lateral displacement relative to the support carriage.

Referring again to FIG. 1, support carriage 20 is provided with guide tracks 31 and 33. It will be noted that the guide rails are shaped so that they will slidingly engage tracks 31 and 33 as further shown in FIG. 5. Preferably these respective guide rails and tracks will be in contact for precise sliding engagement but friction may be of course minimized by utilizing graphite, oil, Teflon coating, bearings, etc. It should be understood that other equivalent means for providing precise longitudinal or linear travel of the support carriage may be used including guide rods and journaled sleeves, wheels and tracks and the like, all within the skill of the art and considered to be within the scope of the invention described.

Figure 5:
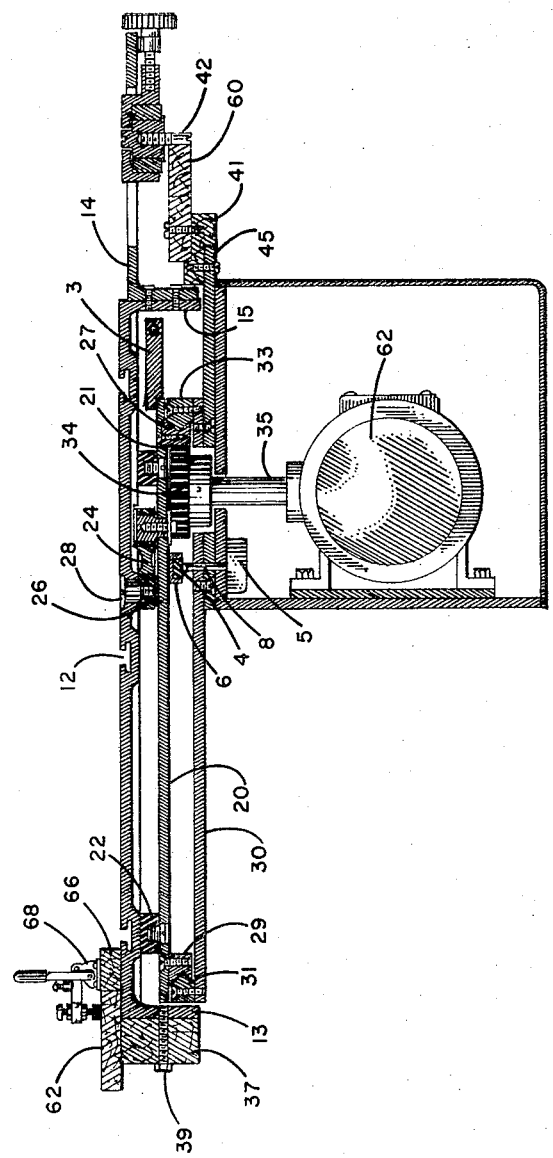
FIG. 5 is an end sectional elevation of the assembly shown in FIG. 4.

As further shown in FIG. 5, gear wheel 34 has a plurality of gear teeth therearound which meshingly engage a toothed track 21 extending along the interior surface of guide rail 27. Accordingly, as gear wheel 34 is driven by a motor via shaft 35, support carriage 20 will be driven and concomitantly secured upper platform 10. It will also be appreciated that as the support carriage is driven, the direction of travel will be precisely along the direction of the guide rails and tracks, which also, because of their fitting engagement, prevent horizontal displacement of the support carriage.

Observing further FIGS. 1 and 5, console 40 is provided with a control panel 42 which includes the various controls for the drive motor including speed controls, where the motor, as preferred is of variable speed in either direction, a reverse switch for reversing the motor so that the support carriage and upper platform can be driven reciprocally forwards and backwards along the guide rails and tracks. The control panel may also include electrical outlets for a remote control foot or hand switching member for actuating the motor and reversing drive direction and an outlet for cutting or shaping tool plugs. Interiorly of the console is located the various electronic controls and motor 62 for driving drive shaft 35 which motor is shown schematically. Also shown in FIG. 1, a base plate 45 is provided and secured to the top of console 40 and to which support plate 30 is secured. Further, drive shaft 35 extends through these stationary and secured plates.

Figure 4:
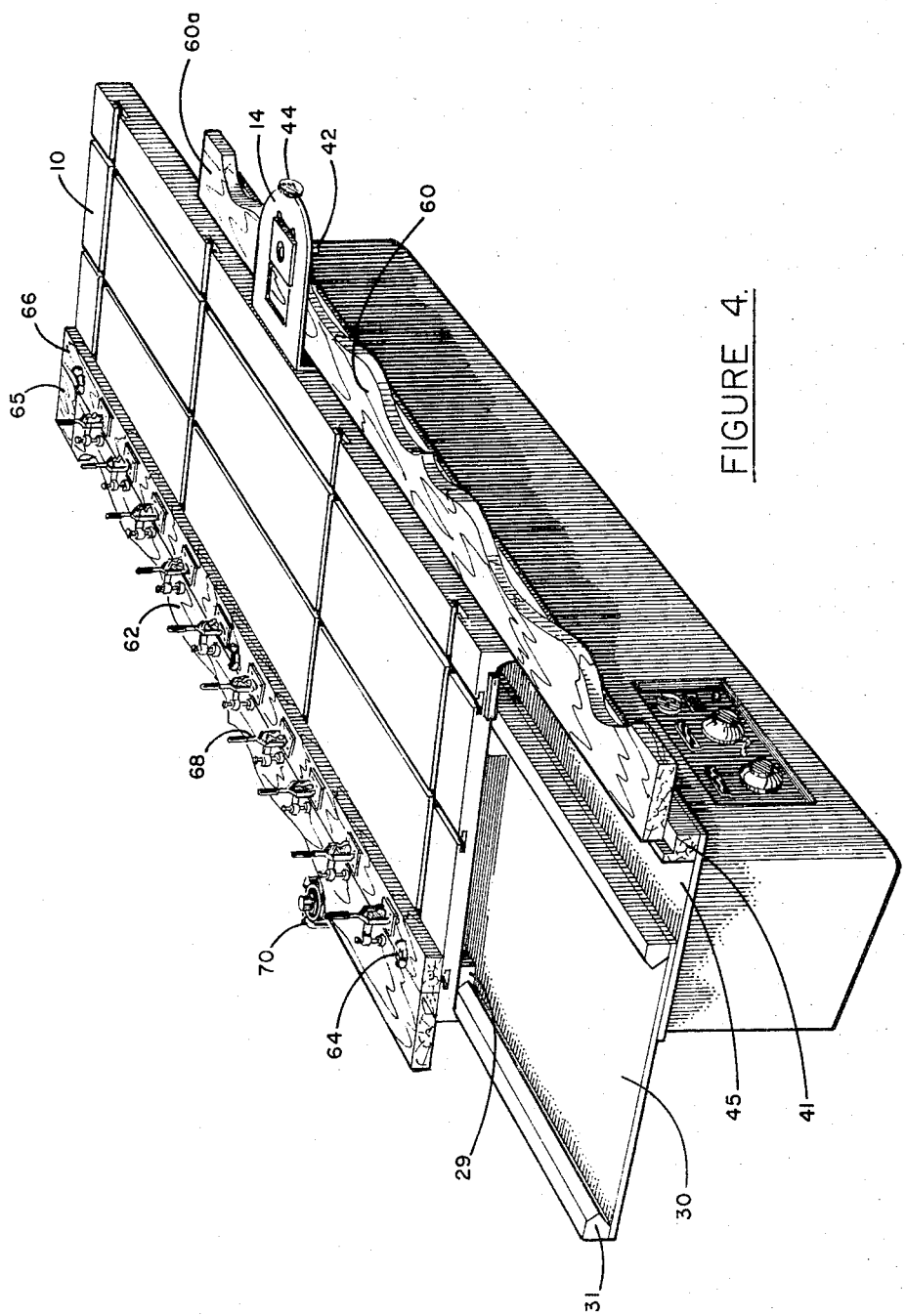
FIG. 4 is a view in perspective of the assembled components shown in FIG. 1 with a template, guide member and material workpiece secured to the assembly in an operating condition.

Observing now also FIG. 4, there is shown the basic material feeding assembly wherein mount 14 is secured to one side of upper platform 10 and to which mount is attached guide member 42 (see also FIG. 5). On the opposite side of the upper platform is secured clamp support 66 to which are attached a plurality of clamps 68 for holding a material workpiece 62. The clamp support is engaged in a transverse slot and anchors 64 may be used for securing the support within the slots. An end member 65 is also preferably attached to the upper platform against which the end of the material workpiece to be shaped is held. A similar holding member may be located at the opposite end but such members are optional.

Template 60 may be stationarily secured by bolts, screws or other similar anchoring means to template support 41 which in turn is secured to plate 45 as also shown in FIG. 5. Accordingly, the template will remain stationary as the support carriage and upper platform are driven along guide rails and tracks. Also observing FIG. 2, upper platform 10, in phantom, is urged laterally by an adjustable biasing member or spring 16 so that guide member 42 maintains contact with the template edge pattern as the upper platform is driven along. At the same time, a cutting or shaping tool 70, which is maintained in a stationary position will shape the material workpiece 62 in accordance with template 60 while the upper platform is driven past the tool. It will be evident that the independent cutting or shaping tool located remotely or opposite the template and guide member will not interfere with precise guidance and lateral displacement of the upper platform as in response to the guide member following the template surface. Moreover, sawdust, shavings or other particulate matter from the shaping operation will not normally interfere with the guide member or template. Driven by the drive motor and gear means described, the upper platform will travel longitudinally with the support carriage and will be urged laterally by the biasing spring so that the shape of the template will be repated on the material workpiece on the opposite side of the apparatus. Biasing spring 16 is attached between the upper platform and the support carriage, preferably with one end 17 secured to the latter and the opposite end 19 to the upper platform.

Provision is also preferably made so that the transverse or lateral bias direction may be selectively varied for either side of the upper platform. This may be easily accomplished by providing securing members for each end of spring 16 on both the upper platform and support carriage. Thus, where the spring is attached with end 19 secured to the upper platform which will urge the platform in the direction of spring end 17, where spring end 19 is instead secured to the support carriage and spring end 17 to the upper platform, the platform will be urged toward spring end 19. Any equivalent means for urging the upper platform laterally to one or the other of its sides relative to its longitudinal travel may be used. It will also be appreciated that the direction of bias will preferably be transverse to the longitudinal direction of travel although as long as the bias is lateral, the actual location of the spring or biasing means is not critical. Moreover, the tension on the spring or other biasing means is also preferably variable so that the force urging the upper platform laterally may be selected.

FIG. 5 also shows a material workpiece support 37 bolted into skirt 13 with bolt 39 or other equivalent securing member so as to further support material workpiece 62. However, it should be appreciated that the types of members and methods for securing template support holder, template, material workpiece and material workpiece supports as well as the clamps are not critical except that those shown and described are by way of illustration only and are not to limit the scope of the invention as disclosed herein.

It is also preferable to include automatic switching means so that when the support carriage has been driven along a length of the longitudinal travel as limited by the length of geared rail 27 (FIG. 5) the drive motor will be reversed so that the upper platform and support carriage will be reciprocally driven in the opposite direction. Moreover, noting again FIG. 5, one or more microswitches may be located along the length of support plate 30 for limiting the length of travel of the support carriage to any longitudinal increment desired. In other words, where relatively short lengths of workpieces are to be shaped, this may be automatically or manually accomplished without waiting for the support carriage to travel along its entire driven length. More particularly for automatic switching, an elongated channel member 6 is secured to the underside of support carriage 20 in which a slidable index block 4 is located. A switch lever 8 extends through the various plates as shown from an electrical switch 5 electrically connected to drive motor 62. Index block 4 may be moved along channel member to any position desired where the direction of support carriage travel is to be reversed which will occur as the block reaches lever 8 and activates switch 5. A pair of index blocks may be used where reversing between two preselected intermediate positions is desired. Automatic shutoff means may also be incorporated so that the drive motor will be turned off or a clutch will disengage gear wheel 34 once the driven assembly is returned to its original starting position. Means is also preferably provided for maintaining the upper platform in a position on the return reciprocal travel so that guide member 42 will be held away from template 60 as will also already shaped material workpiece 62 from cutting tool 70. This feature may be better understood by observing FIGS. 4 and 5 in which end 60a of the template is shown projecting outwardly somewhat from the surface template pattern. Accordingly, on the first travel of the upper platform toward template end 60a, guide member 42 will cause the upper platform to be urged as viewed, from left to right as the guide member travels to the outermost position on template end 60a. At that point, stop member 3, provided on the upper platform, will drop and engage the support carriage so that the upper platform will be maintained in its full right hand displacement during the return travel. A lever 2 for manually disengaging stop member 3 is also illustrated. The use and practicality of such an automatic safety stop from the above description will be appreciated by those skilled in the art. The stop member may then be manually or automatically disengaged when another material workpiece is to be cut and the drive motor again activated to drive support carriage and upper platform. The stop member may also be preferably adjustable so that the stop position of the support carriage may be selected at any desired point along its linear travel.

Figure 3:
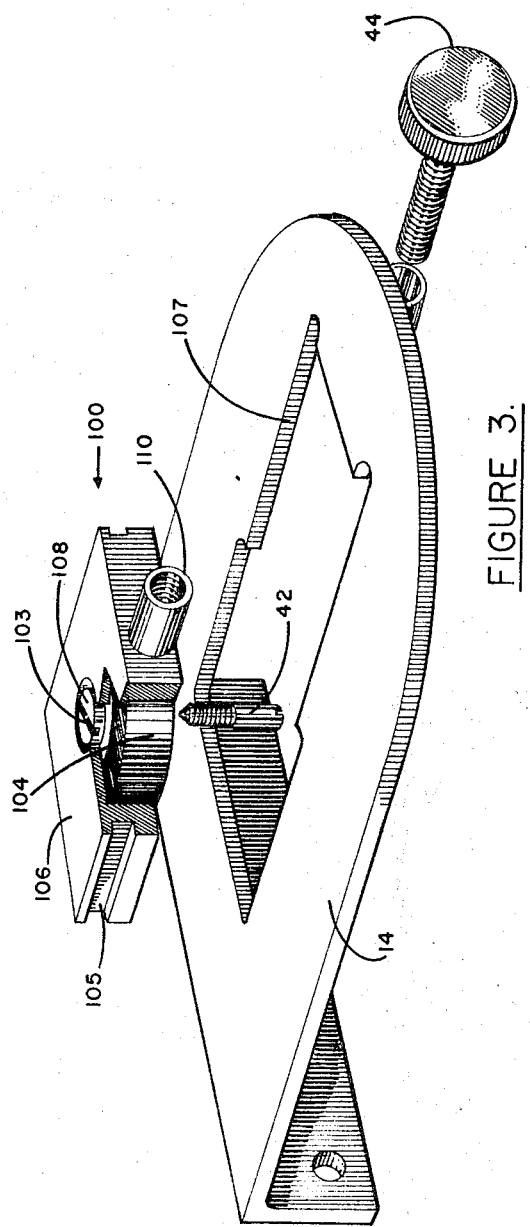
FIG. 3 shows a preferred guide member assembly, partially cut away, and mount.

Referring to FIGS. 1, 3 and 5, there is illustrated a preferred guide member assembly 100 for removable attachment to mount 14. The assembly includes bearing 104 rotatably secured in housing 106 a portion of which is cut away in FIG. 3 to expose the bearing. A guide member 42 has a threaded portion for threadedly engaging the center of bearing 104 as shown disengaged in FIG. 3. This feature will allow an operator to exchange a guide member for one of different size (length of diameter) as desired, without removing or changing the bearing or the complete guide assembly. A tab 108 having slot 103 (or similar visible indicia) exposed is optionally provided which tab is also secured to the center of bearing 104 for the purpose of allowing an operator to observe the tab's rotation clearly evidenced by the turning slot. As guide member 42 engages and moves along a template, it will turn thereby rotating the inner part of bearing 104 and tab 108. However, if the guide member becomes displaced or moves out of contact with the template it will nor be turned nor will tab 108 be rotated. Accordingly, the operator will, by observing the tab, be aware of whether or not the guide member is abutting the template surface. Mount 14 includes adjustment knob 44 for adjusting the distance between guide member 42 and the side of the upper platform. By turning the knob which threadedly engages member 110, the guide assembly will be forced toward or away from the knob with channels 105 on each side of the housing sliding along flanges 107. Such an adjustment feature will give the device flexibility in depth of cut and also allows for matching the size of guide pin 42 with the size of the cutter used to cut a template.

The assembly of the invention offers particular advantage in that the guidance and drive mechanisms are remote from and completely independent of any working, cutting or shaping tool that may be used in conjunction with the apparatus. This feature, for example, allows an operator to select any number of different types of tools or shapers including cutters and bits of various sizes, for either rough or finish work, sanders, routers, etc. The working tool may also be a painting gun or brush or drawing or scribing tool. Moreover, a tool may be tilted with respect to the workpiece which allows a pattern to be formed on the material at any desired angle without otherwise affecting the operation described. In addition, since the guide member is remote from the cutting or shaping tool as is the template, normally being located on or adjacent a side of the upper platform opposite the tool and material workpiece, particles of the cut workpiece will not readily accumulate on the template or guide member surface which could otherwise affect the accuracy of reproduced shapes. Observing again FIG. 4, another advantage is that a mirror image of the design or shape of template 60 may be formed on material workpiece 62 by simply turning the template over, i.e., reversing the ends. This will be advantageous where the template has an unsymmetrical pattern and a left or right variation is desired.

Figure 6:
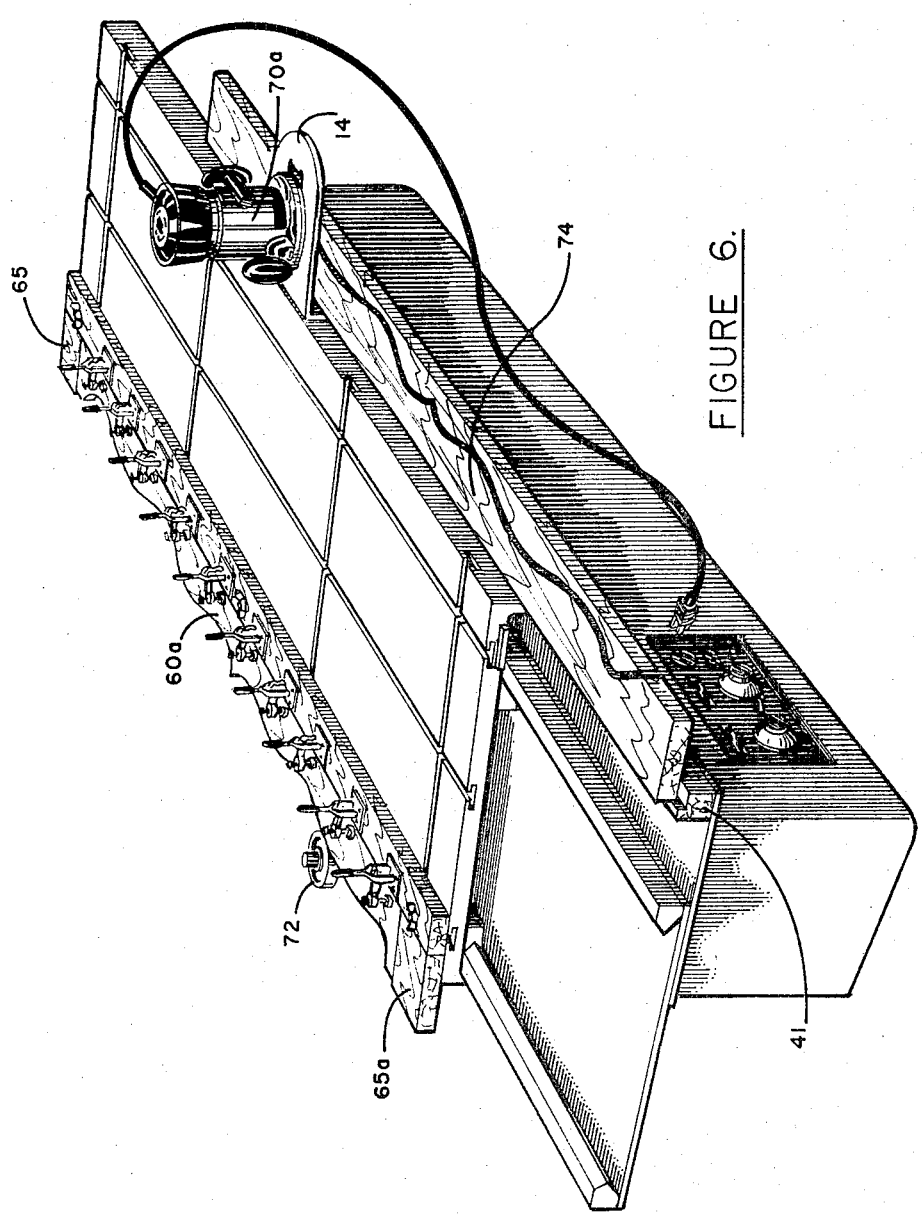
FIG. 6 is a perspective view of a different embodiment of the basic assembly used for preparing a template.

Referring now to FIG. 6, there is shown an alternative embodiment to the apparatus illustrated in FIG. 4 whereby template 60 has been positioned on the opposite side of the upper platform between end supports 65 and 65a and a material workpiece 74 has been secured on template support 41. A router 70a has been placed on mount 14 and guide member 72 stationarily supported on the opposite side. The purpose for this embodiment is not only to illustrate cutting a material workpiece on the opposite side of the apparatus but also to show that the device has the capability to cut its own template. For example, template 60a shown in FIG. 6, may actually be an original shaped article or piece to be duplicated and which may serve as the "template" for cutting a template 74 and which template (74) may serve as template 60 shown, for example, in FIGS. 4 and 5. Cutting tool 70 will again be replaced for guide member 72, router 70a removed and guide member assembly 100 again secured to mount 14 so that the device will function as described regarding FIGS. 3- 5.

Figure 7:
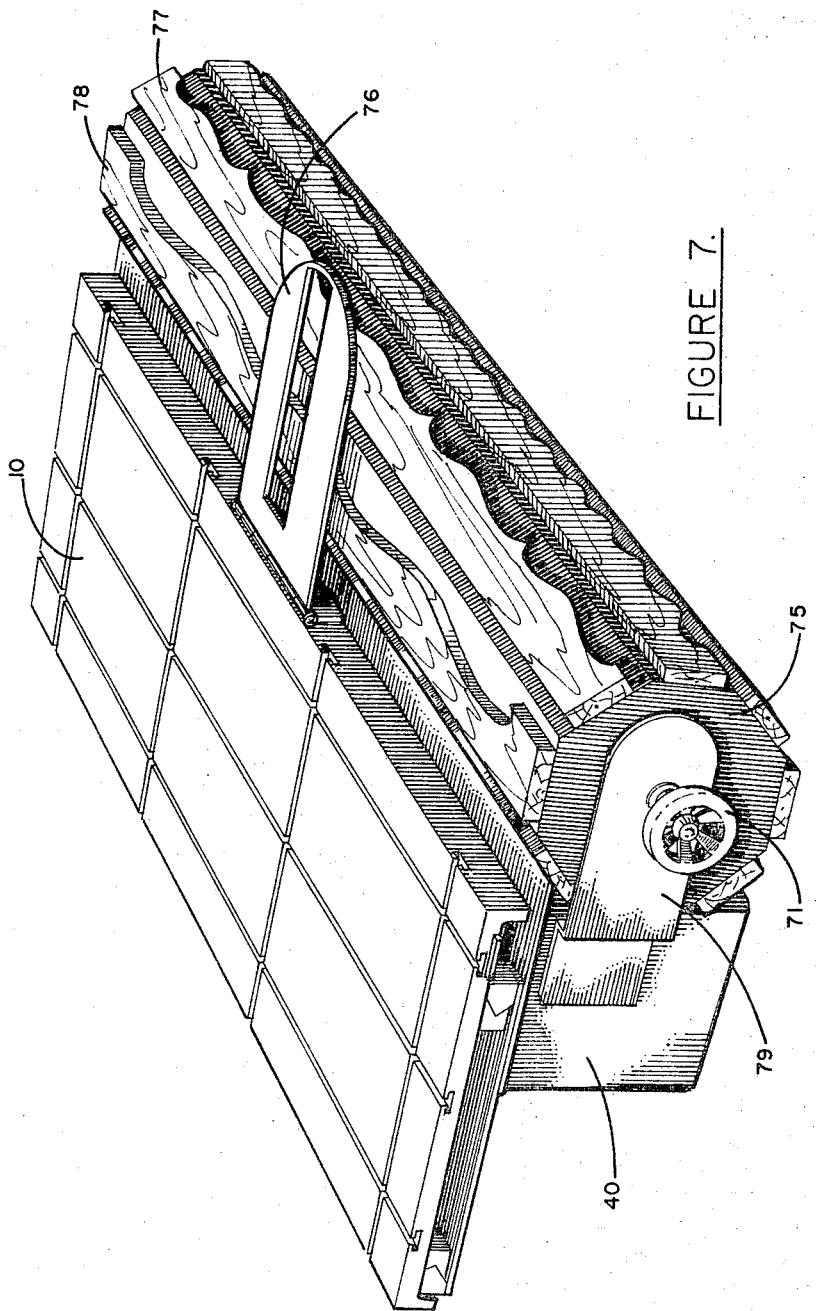
FIG. 7 is a perspective view of another embodiment showing a multiple template drum.

FIG. 7 illustrates another embodiment whereby a plurality of templates two of which are indicated 77 and 78 may be secured to a rotatable drum or turret 75 secured adjacent the apparatus by a pair of brackets 79 which may be attached to console 40 as shown. Hand wheel 71 may be used to tighten the drum on the support brackets once the desired template 78 is indexed properly adjacent the upper platform. It will also be noted that mount 76 is hinged so that it may be elevated to give adequate clearance when the drum is turned for indexing different ones of the various templates. Template drum 75 may also be removed by loosening hand wheel 71 which may be threadedly engaged to a spindle extending between the support brackets and a different drum having a variety of other shaped templates replaced on the brackets. It will also be noted that mount 76 is somewhat enlarged as shown for simply giving greater flexibility to the types of guide members, or working or shaping tools which can be mounted thereon as well as the distance from the upper platforms. It should be understood that although the assembly shown and described hereinabove has featured the shaping or forming of a single material workpiece at a time, in practice any number of workpieces may be formed simultaneously using a single template with the operation as set forth. Thus, a plurality of workpieces may be stacked on one another or they may be independently secured remotely from the apparatus on appending members attached to the upper platform using the required number of shaping tools. Alternatively, portable shaping tools may be remotely secured to the upper platform in positions to shape a like number of remotely stationed workpieces and the shaping tools having the same movement as tool 70a shown in FIG. 6, being guided from a single template.

An important feature of the invention is its adaptability to a variety of guiding, cutting and shaping operations. More specifically, because of the unique features as well as being unencumbered from the top by permanent cutting tools, support arms, material workpiece support bracket or clamps and the like except for those which may be removed as previously described, a variety of additional accessories may be provided with the assembly. Types of such accessories are illustrated in FIGS. 8–12, the operation, features, uses and advantages of which will be now described.

Figure 8:
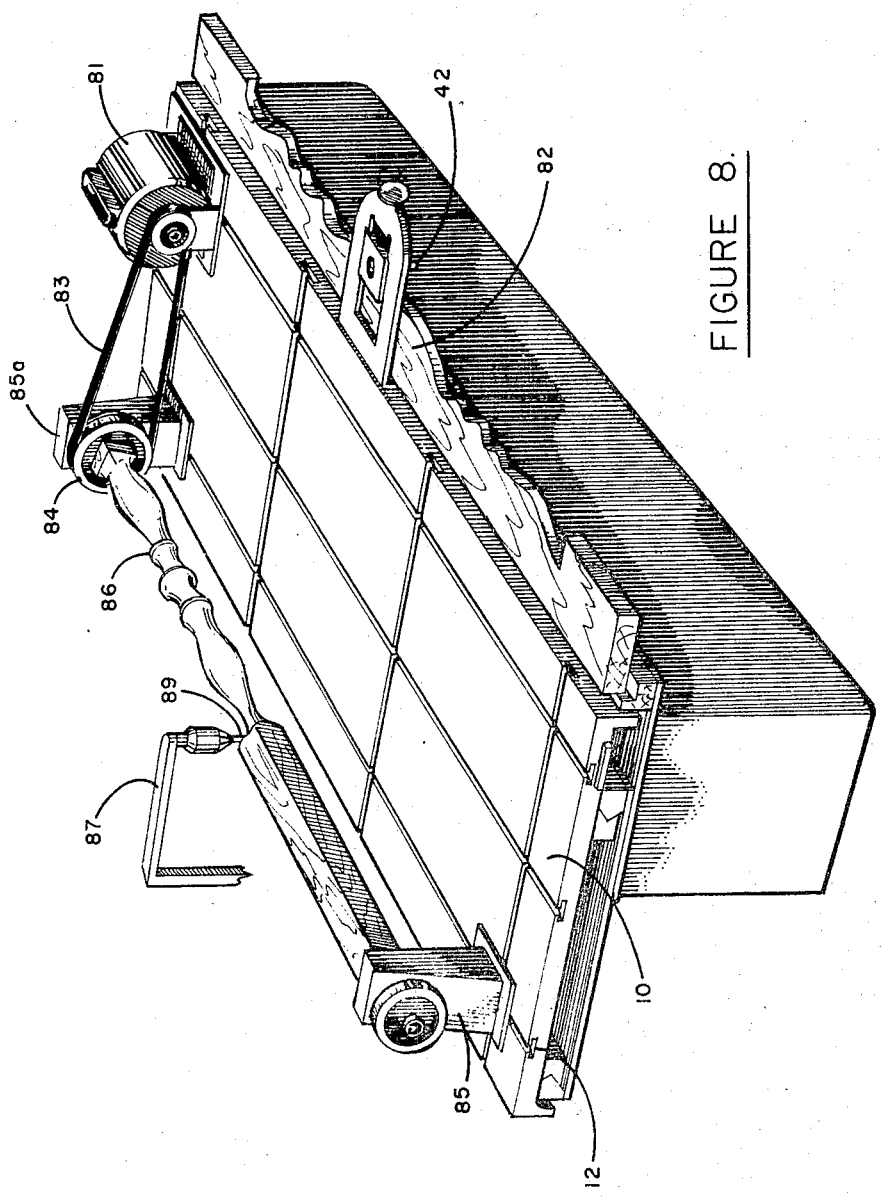
FIG. 8 is a perspective view of an embodiment showing a lathe accessory.

FIG. 8 illustrates a lathe-type accessory which may be secured to the exposed surface of the upper platform and which may be used to produce symmetrical shaped materials. Observing FIG. 8, a simplified device requires only the assembly of the invention to which is secured the accessory parts illustrated and utilizing independent cutting or shaping tool 89. More specifically, template 82 is secured to the apparatus illustrated in FIG. 4. A pair of support stands 85 and 85a are secured within slot 12 on the top of upper platform 10. Again, it will be appreciated that these support stands are secured in the slot by use of an adjustable slot engaging members provided at the base of the support stands. Further, it will be understood that the distance between the support stands may be adjusted as desired by simply loosening the anchors and forcing the stands towards or away from one another. A drive motor 81 is similarly secured to another slot on the upper platform and which motor may be variable speed as well as having other controls desired which are not critical to the apparatus or the invention. One or both of the support stands may be provided with a pulley 84 shown secured to the support stand 85a. A drive belt 83 is also provided to engage the pulley and a fly wheel of the drive motor for turning the material workpiece 86 between the support stands. A stationary cutting or shaping tool 87 having a cutting blade 89 engages the material workpiece as upper platform 10 is driven longitudinally along the guide tracks and rails and at the same time is displaced laterally as guide member 42 maintains abutting engagement with the edge of template 82 as shown and as previously described. In this manner, the shape formed on the material workpiece will depend on the shape of the template and will gradually be cut as the workpiece is continually turned about its elongated axis between the support stands. Moreover, it may be desirable in this embodiment to drive the support carriage and upper platform relatively slowly or reciprocally back and forth until the shaping has been completed. It will also be appreciated that a plurality of cutting tools may be used at the location of tool 87. It should be appreciated that a plurality of material workpieces may be mounted on a plurality of support stands each cooperating with drive means for rotating or turning the workpieces in synchronization. Accordingly, with a single template, any number of workpieces may be shaped simultaneously using a like number of shaping tools in the manner described.

Figure 9:
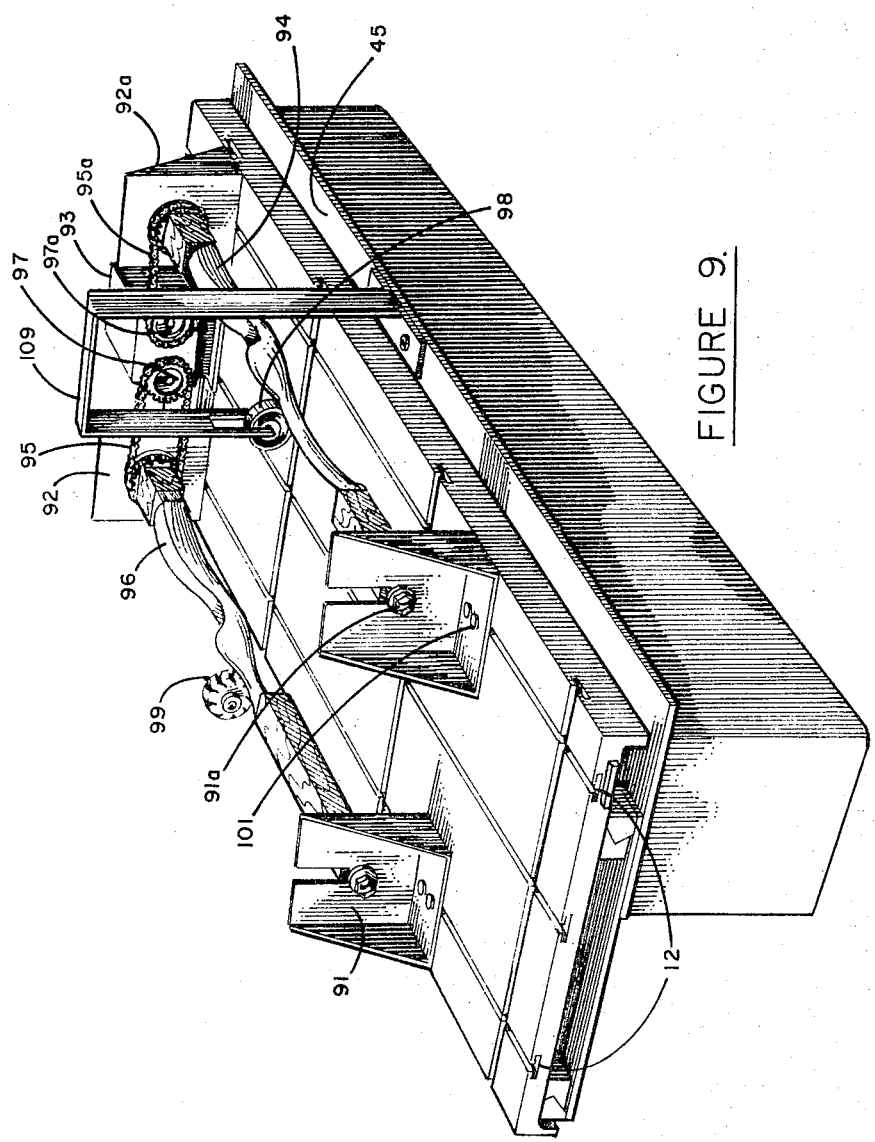
FIG. 9 is a perspective view showing another lathe accessory for reproducing irregular or unsymmetrical template shapes on a material workpiece.

FIG. 9 illustrates still another embodiment but similar to that of FIG. 8 in which a lathe-like accessory is secured to the upper platform. However, in this embodiment unsymmetrical or irregular designs may be reproduced on a material workpiece. In this embodiment, two pairs of opposed and facing end stands are used and secured to slots 12 on the upper platform as previously described. A first pair of end stands 91a and 92a are used to support template 94 having the shape of an unsymmetrical table leg shown by way of illustration and example only. A material workpiece 96 is secured between end stands 91 and 92 and a drive motor 93 drives sprocket wheels 97, 97a and chains 95, 95a which turns the respective sprocket wheels on the stands 92 and 92a as shown in the same or opposite directions. In the embodiment illustrated, the drive for both the template and the material workpiece will be substantially identical assuming the sprocket wheels are of the same diameter and which is desirable so that the precise shape of the template will be reproduced on the material workpiece.

As the template and material workpiece are rotated or turned between the supporting end stands a guide member 98 held by a stationary arm 109 constantly engages template 94 as the template travels longitudinally and laterally with the upper platform. Concurrently, an independent stationary cutter or shaping tool 99 engages material workpiece 96 and forms shapes reproducing the shape of the template as the upper platform is displaced longitudinally and laterally with respect to the stationary guide member 98. Again, the direction in which the upper platform is constantly urged by a biasing member as viewed, will be toward the left to maintain abuttment between the template surface and the guide member. Accordingly, with this lateral movement as well as the longitudinally driven motion of the upper platform as previously described, the material workpiece will be gradually shaped. In order to ensure that the shape is more precisely that of the template, the upper plate may be driven reciprocally a number of times past the stationary shaping tool until the desired result is achieved. Motor 93 may also be provided with variable speed controls and the like and which controls may be actuated by an operator. It will be noted that stationary arm 109 is secured to base plate 45 (see FIGS. 1 and 5). Accordingly, the basic apparatus as previously described hereinabove may be readily modified for this embodiment by simply removing template support 41 and securing the guide support arm 109 to base plate 45. It should also be understood that in this embodiment where the template and material workpiece are turned simultaneously in opposite direction the material workpiece will be shaped to form a mirror image of the template, and when turned in the same direction an exact copy will be formed. This modification will be appreciated by those skilled in the art. Moreover, as previously explained regarding FIG. 8, a plurality of material workpieces may be shaped simultaneously using the single template and incorporating a desired number of end stands, driving means and cutting tools with the operation proceeding otherwise as described.

A further accessory embodiment is illustrated in FIGS. 10 and 11 wherein rotatable table 120 is mounted on upper platform 10. The rotatable table accessory includes a drive motor 114 and is secured to upper platform 10 along slots 12 using anchoring means as previously described regarding other accessory components. The rotatable table is driven by shaft 116 which is secured to center of the table and about which shaft axis the table rotates. Supports 115 similar to pads 22 shown in FIG. 1 may also be used made of Teflon or other low friction material and which pads will support the weight of the table. In operation, one or more material workpieces 112 to be shaped by independent cutting tool 122, are preferably secured to upper table surface 120 as shown near or adjacent the outer table edge for ready exposure to the cutting tool as table 120 rotates. Template 118 is secured to the table, and as illustrated may be preferably attached to the table underside so that shavings, dust, and the like will not interfere with the template surface as it contacts guide member 42.

During a shaping operation, as the rotatable table turns, it will advance material workpieces placed around the periphery or table edge past the cutting tool which will act on the material workpiece and form a shape thereon. The shape will be determined by the shape of template 118 which maintains abuttment with guide member 42 and which guide member is stationary and attached to console 40. At the same time, biased upper platform 10 is urged laterally to the left as FIGS. 10 and 11 are viewed, carrying with it rotatable table 120 so that the inner edge of template 118 maintains contact with guide member 42 as table 120 rotates. In this embodiment the drive means for longitudinal movement of the support carriage is not activated. It should also be appreciated that a single continuous template may be used or one or more individual ones may be so secured. The material workpieces will also be laterally shifted relative to stationary cutting or shaping tool 122 which will thus cause a pattern corresponding to template 118 to be formed on the material workpiece. It will be understood that the material workpieces can then be removed after they have been shaped. Moreover, by exchanging a guide member for cutter 122 and an original shaped article or piece for workpiece 112 and a cutter for guide member 42, a template will be cut in a manner similar to that described regarding FIG. 6. It will also be understood that the templates or template can be removed and other templates secured in their place. Further, it will also be preferred that drive means for the rotatable table is reversible so that the direction of rotation can be reversed either manually or automatically with suitable switching means for either as will be understood by those skilled in the art.

Figure 12:
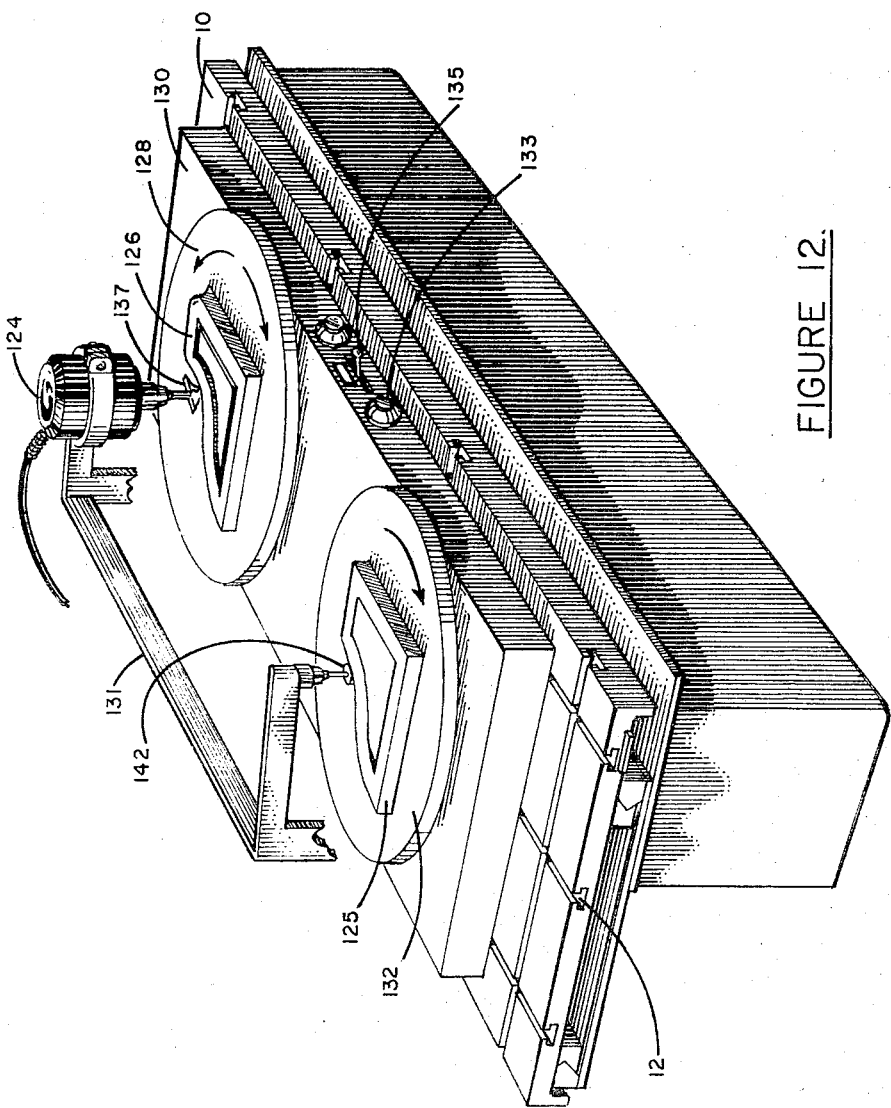
FIG. 12 is a perspective view illustrating the dual rotatable table attachment on the assembly of the invention.

FIG. 12 shows a further accessory embodiment utilizing a pair of rotatable tables 128 and 132 which are mounted on support console 130 which houses drive means for the tables. On the front of the console are controls 133 for varying the speed and synchronized rotation of the tables, two of which controls are shown so that each table can be independently so varied. Reversing lever 135 or the like may also be used for reversing the direction of table 128 so that it can travel either clockwise or counterclockwise as desired. Again, support console 130 is mounted on upper platform 10 and secured in slots 12.

Mounted or fastened to table 132 is template 125 while on the other platform 128 is a material workpiece 126. An independent stationary cutting tool 124 having a shaping bit 137 is secured to support arm 131 as is guide member 142. Accordingly, the guide member and cutting tool are secured apart from one another but at a fixed selected distance and are maintained stationary at those positions during operation. In operation, the rotatable tables are driven, in the same direction where an exact duplicate of the template is desired on a material workpiece whereas table 128 is driven in an opposite direction where a mirror image or opposite shape is desired to be formed. As the tables rotate, upper platform 10 and concomitantly console support 130 and the rotating tables will be displaced laterally as the upper platform is urged to the left as the assembly is viewed, so that the edge of template 125 maintains abuttment with guide member 142. Again, the direction in which the upper platform is laterally urged is not critical so long as it directs the rotating template to maintain abuttment with the guide member. In this embodiment the drive means for driving the support carriage longitudinally is not activated. In this manner, the peripheral shape of template 125 can be exactly reproduced on material workpiece 126. It will also be noted that the templates shown, and the material workpiece have a pattern interiorly disposed from the outer edge and which pattern is also similarly shown. The distance between the center of each of the rotating tables should be substantially the same distance as that between the center of the guide member and the center of the working tool in order that the shape of any template pattern mounted on rotatable table 132 will be reproduced on a material workpiece mounted on table 128. For this purpose, there is preferably provision for varying the distance between the two tables. It should be appreciated that the assembly shown is not to be limited to two rotatable tables but instead any number of such tables may be utilized driven in synchronized rotation. Thus, with the guidance of the assembly from one template on one table as shown, any number of material workpieces may be shaped on the plurality of rotating tables using a plurality of cutting or shaping tools otherwise in the same manner as previously described.

It is to be understood that the feed assembly disclosed herein may be placed or positioned adjacent any accessible working, shaping or cutting tool whereby these tools can perform their function on a material workpiece attached to the assembly. As previously explained portable tools may be mounted adjacent the upper platform. Alternatively, the assembly may be mounted on a cutting tool support simply by bolting or otherwise stationing it adjacent the working tool. Accordingly, the assembly will be understood to provide a variety of alternative placements for use in shaping, working or forming operations. These as well as other advantages will be appreciated by those skilled in the art.

I claim:

1. A material feeding and shaping assembly comprising:
   a. a support carriage,
   b. an upper platform mounted on said support carriage,
   c. means secured between said upper platform and support carriage for directing eccentric lateral and parallel displacement of said upper platform relative to said support carriage,
   d. drive means for driving said support carriage reciprocally along a substantially linear guide member, and
   e. biasing means for urging said upper platform laterally.

2. The assembly of claim 1 wherein said secured means comprises a plurality of pivot arms one end of each arm pivotally attached to said upper platform and the opposite end pivotally attached to the support carriage.

3. The assembly of claim 1 including a base member for supporting said upper platform and support carriage.

4. The assembly of claim 3 including a guide member secured adjacent a side of said upper platform.

5. The assembly of claim 3 including template securing means attached to said base member and a rotatable template holding member removably attached to said template securing means said holding member having a plurality of templates mounted thereon.

6. The assembly of claim 4 including template securing means attached to said base member and a rotatable template holding member removably attached to said template securing means and having a plurality of templates mounted thereon whereby selected ones of said templates may be alternately positioned for contacting said guide member.

7. The assembly of claim 3 including a mounting bracket attached to said upper platform adjacent one side for interchangeably mounting a guide member or a cutting tool.

8. The assembly of claim 4 including a template secured to said base member said template being maintained stationary and wherein said guide member is attached to said upper platform and is urged against said template.

9. The assembly of claim 8 including means for securing a material workpiece adjacent a side of said upper platform opposite said guide member.

10. The assembly of claim 1 including low friction support member secured between said support carriage and said upper platform on which support members said upper platform is mounted.

11. The assembly of claim 1 wherein said drive means comprises a reversible motor and gear means.

12. The assembly of claim 11 wherein said gear means comprises a gear wheel driven by said motor and a toothed linear track attached to said support carriage said gear wheel and toothed track being meshingly engaged.

13. The assembly of claim 12 including switching means for automatically reversing said drive motor when said gear wheel reaches an end of said toothed track.

14. The assembly of claim 11 including adjustable switching means for automatically reversing said drive motor when said support carriage reaches preselected positions along said linear guide member.

15. The assembly of claim 11 including stop means for terminating linear travel of said support carriage along said guide member.

16. The assembly of claim 8 including a guide mount secured to said upper platform adjacent a side and having a slot extending at an angle relative to said upper platform side, said guide member being adjustably secured along said slot.

17. The assembly of claim 16 wherein said guide member comprises a guide pin removably engaging a rotatable bearing.

18. In combination the assembly of claim 1 and a lathe assembly attached to said upper platform said lathe assembly comprising a pair of supports rotatably securing a material workpiece therebetween and means for rotating said workpiece between said supports.

19. The combination of claim 18 wherein said rotating means comprises a motor driven means.

20. The combination of claim 19 including a template stationarily secured adjacent said upper platform and a guide member attached to said upper platform wherein said guide member is urged against said template.

21. In combination, the assembly of claim 1 and a lathe assembly mounted upon said upper platform comprising two pairs of supports, one of said pair for rotatably securing a material workpiece therebetween and the other pair for rotatably securing a template therebetween having a three dimensional pattern to be reproduced on said workpiece, and means for simultaneously rotating said workpiece and template between said supports respectively.

22. The combination of claim 21 wherein said rotating means comprises motor driven means for variable synchronized rotation of said template and said workpiece.

23. The combination of claim 21 including a stationary guide member against which said template is urged.

24. The combination of claim 23 further including a base member for supporting said upper platform and support carriage and to which base member and guide member is secured.

25. The combination of claim 22 wherein said rotating means provides variable synchronized rotation of said template and said workpiece in the same or opposite directions.

26. The combination of claim 25 wherein said rotating means comprises first and second drive members and first drive member for rotating said template and said second member for driving said workpiece.

27. In combination the assembly of claim 1 and a rotatable table mounted on said upper platform and variable drive means for rotating said table.

28. The combination of claim 27 wherein said drive means is reversible.

29. The combination of claim 27 including a template attached to said table and a guide member against which said template is urged.

30. The combination of claim 29 further including a base member for supporting said upper platform and support carriage and to which base member said guide member is secured.

31. The combination of claim 27 further including means for securing a material workpiece to said table.

32. The combination of claim 29 including a shaping tool adjustibly secured adjacent said platform.

33. In combination the assembly of claim 1, and a plurality of rotatable tables mounted on said upper platform, and drive means for rotating said tables.

34. The combination of claim 33 wherein said drive means includes means for varying the rate and direction of rotation of one or more of said tables.

35. The combination of claim 33 including a template attached to one of said tables and a stationary guide member against which said template is urged.

36. Apparatus for directing a material workpiece to a working tool comprising:
 a platform for mounting said workpiece thereon,
 means for directing said platform along a substantially linear guide path, and
 means for guiding said platform laterally and eccentrically relative to said linear guide path.

37. Apparatus of claim 36 including biasing means for urging said platform laterally.

38. Apparatus of claim 36 including drive means for advancing said platform along said linear guide path.

* * * * *